(12) United States Patent
Seger (10) Patent No.: US 7,178,031 B1
(45) Date of Patent: Feb. 13, 2007

(54) WIRELESS SECURITY ACCESS MANAGEMENT FOR A PORTABLE DATA STORAGE CARTRIDGE

(75) Inventor: Paul Joseph Seger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/435,899

(22) Filed: Nov. 8, 1999

(51) Int. Cl.
*H04K 1/00* (2006.01)
*G03F 7/00* (2006.01)

(52) U.S. Cl. ............................ 713/182; 707/9; 707/100

(58) Field of Classification Search ................ 359/152; 705/54; 713/175, 201, 192, 155, 209, 158, 713/168–171, 182; 380/4, 49, 23, 25, 271; 398/126; 707/9, 100; 711/163
See application file for complete search history.

(56) References Cited

U.S. PATENT DOCUMENTS

| | | | |
|---|---|---|---|
| 3,859,624 A | 1/1975 | Kriofsky et al. | 340/38 L |
| 4,405,829 A | 9/1983 | Rivest et al. | 178/22.1 |
| 4,650,981 A | 3/1987 | Foletta | 235/449 |
| 4,748,668 A | 5/1988 | Shamir et al. | 380/30 |
| 4,941,201 A | 7/1990 | Davis | 455/41 |
| 4,956,769 A * | 9/1990 | Smith | 707/9 |
| 5,065,429 A | 11/1991 | Lang | 380/25 |
| 5,581,763 A | 12/1996 | Hait | 395/186 |
| 5,623,546 A | 4/1997 | Hardy et al. | 380/4 |
| 5,630,057 A | 5/1997 | Hait | 395/186 |
| 5,796,824 A | 8/1998 | Hasebe et al. | 380/4 |
| 5,805,800 A | 9/1998 | Kotani et al. | 395/186 |
| 5,857,021 A | 1/1999 | Kataoka et al. | 380/4 |
| 5,872,846 A * | 2/1999 | Ichikawa | 380/282 |
| 5,889,866 A * | 3/1999 | Cyras et al. | 713/192 |
| 5,933,498 A * | 8/1999 | Schneck et al. | 705/54 |
| 5,982,520 A * | 11/1999 | Weiser et al. | 398/126 |
| 6,038,563 A * | 3/2000 | Bapat et al. | 707/10 |
| 6,084,969 A * | 7/2000 | Wright et al. | 380/271 |
| 6,092,201 A * | 7/2000 | Turnbull et al. | 713/201 |
| 6,370,629 B1 * | 4/2002 | Hastings et al. | 711/163 |
| 6,446,206 B1 * | 9/2002 | Feldbaum | 713/175 |
| 6,477,653 B2 * | 11/2002 | Naito | 713/200 |

FOREIGN PATENT DOCUMENTS

| | | |
|---|---|---|
| JP | 11-007412 | 1/1999 |
| JP | 11-025045 | 1/1999 |
| JP | 11-161551 | 6/1999 |
| WO | WO 87/ 07062 | * 11/1987 |
| WO | 97 41562 A | 11/1997 |

* cited by examiner

*Primary Examiner*—Sam Rimell
*Assistant Examiner*—Jacob F. Betit
(74) *Attorney, Agent, or Firm*—John H. Holcombe (57) ABSTRACT

A portable security system mounted in a portable data storage cartridge for managing access by users to the cartridge. A programmable computer processor mounted in the cartridge is powered by and transfers data to a data storage drive via a wireless RF interface, when mounted in the drive. A user table has a unique user identifier for each authorized user and lists permitted activities of the user for the cartridge. The user identifier comprises a user symbol and a user decrypting sender public key. An authentication message from the authorized user is encrypted by a sender private key and a receiver public key. The cartridge processor decrypts the message employing a receiver private key and the sender public key, whereby the user authentication message is known to have come from the user and grants access to the user for the listed activities for the cartridge.

11 Claims, 5 Drawing Sheets

WIRELESS SECURITY ACCESS MANAGEMENT FOR A PORTABLE DATA STORAGE CARTRIDGE

FIELD OF THE INVENTION

This invention relates to the protection of data stored in portable data storage cartridges, and, more particularly, to providing secure access to the data stored in portable data storage cartridges.

BACKGROUND OF THE INVENTION

Data storage cartridges are typically employed to store data which may be transported between data storage drives and may be stored separately from the data storage drives between uses. Much of the data must be secured with respect to outsiders, and much of the data must be secured in favor of some users with respect to other users. Only certain users should be allowed access to certain data, and certain users should be allowed to define who has access to that data. An example comprises payroll information, and another example comprises financial account information. Further, the authorized users tend to change over time.

Thus, it is advantageous to not only provide security for data stored in data storage cartridges, but also to manage the access to that data to particular users, and to different users for different data storage cartridges.

Security of data stored in portable data storage cartridges is typically managed by encrypting the data and providing a key for decrypting the data. Typically, a data processing system includes or obtains the decryption key, and users which are authorized access to the data are listed in the data processing system. The data processing system provides the key and decrypts the data of the data storage drive accessing the data storage cartridge. One example is described in U.S. Pat. No. 5,857,021 in which permission data is written into the data storage media of the cartridge which contains an encrypted key that is necessary for decrypting the data. The key can be decoded only with valid IDs of the equipment of the data processing system. The data processing system thus provides the decrypting key and the user is authorized access by a table in the data processing system.

A difficulty is that the access by a user to the data is not portable even though the data storage cartridge is portable. The access by a user is limited to a data processing system having the authorization table and having the decryption key.

Data processing systems are continually being updated and the authorization tables must be transferred to the new system, and correlated with the data storage media to which access is required. The management of the authorization table is typically handled by other organizations, such as IS, than those responsible for the security of the data. The changes to the table and correlation to the data and to the various data processing systems become a source of loss of security.

SUMMARY OF THE INVENTION

An object of the present invention is to provide a security system which is portable and may be managed to accommodate changes to access to the data.

Disclosed is a portable security system, method, and computer readable program code of a computer program product, which resides in a portable data storage cartridge for managing access to the portable data storage cartridge.

The data storage cartridge has a data storage media, such as a magnetic tape or an optical disk, for storing data for read/write access by a user of a data storage drive when mounted in the data storage drive.

The portable security system comprises a wireless interface mounted in the portable data storage cartridge for receiving power and data from, and sending data to, the data storage drive when mounted in the data storage drive. The wireless interface preferably comprises an RF interface. A programmable computer processor is mounted in the portable data storage cartridge and coupled to the wireless interface. The computer processor within the portable data storage cartridge is powered by the wireless interface and receives and transmits data to the data storage drive via the wireless interface. The computer processor provides a user table comprising at least one unique user identifier for each authorized user, which may comprise a user symbol and a corresponding user key, and at least one permitted activity the user is authorized to conduct with respect to the data storage media. The user identifier, when combined with a user authentication message from the authorized user in accordance with a predetermined algorithm, authorizes the user. The computer processor within the portable data storage cartridge receives user authentication messages from the data storage drive via the wireless interface, and combines the user authentication message with the user identifier from the user table in accordance with the predetermined algorithm to authorize or deny the user activity, and transmits the user authorization or denial to the data storage drive via the wireless interface.

Preferably, a private key, public key cryptographic algorithm is employed. Thus, each user identifier in the user table comprises a user symbol and the user's decrypting sender public key, wherein the user authentication message comprises an encrypted user authentication message which may be decrypted by the user decrypting key, specifically comprising a request for access encrypted by a sender private key and a receiver public key, and wherein the employed private key, public key cryptographic algorithm decrypts the user authentication message employing a receiver private key and the sender public key, whereby the user authentication message is known to have come from the user.

The permitted activities in the user table may comprise 1) read access to data stored in the data storage media, 2) write access to data stored in the data storage media, 3) read the user entry of the user table, 4) read all entries of the user table, 5) add entries to the user table, and 6) change/delete entries to the user table. Each of the users may be authorized to conduct selected ones of the plurality of activities.

A class table is additionally provided that has an unique class identifier for each authorized class of users, which may comprise a class symbol and a corresponding class key and at least one permitted activity each class of users is authorized to conduct with respect to the data storage media. The class identifier, when combined with a user authentication message from a user of the authorized class of users in accordance with the predetermined algorithm, authorizes the user. The user table additionally comprises any class membership of each user, wherein the user may be authorized with respect to the class table either by the class authorization or by the user authorization. The user table permitted activities may additionally comprise 3) read all entries of the class table, 4) add entries to the class table, and 5) change/delete entries to the class table.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
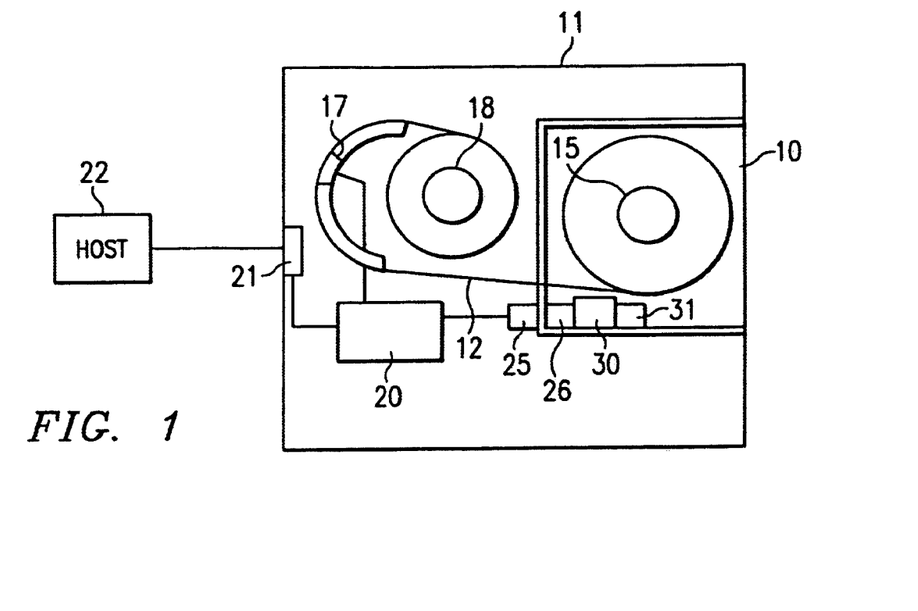
FIG. 1 is a diagrammatic representation of a data storage cartridge with a data storage drive and a host in accordance with the present invention.

Referring to FIG. 1, a data storage cartridge 10, such as a magnetic tape cartridge (as illustrated) or an optical disk, is loaded into a data storage drive 11. An example of a data storage cartridge is an IBM 3590 data tape cartridge. Another example is an LTO (Linear Tape Open) data tape cartridge.

The data storage cartridge has a storage media 12, such as a magnetic tape, that is stored on a tape reel 15 and may be threaded into the data storage drive 11. As an example, the magnetic tape 12 is threaded past a read/write head 17 to a take-up reel 18. A drive controller 20, which includes both read/write electronics and control circuitry for operating the drive, is coupled to the read/write head 17 for reading data from, or writing data to, the storage media 12. The drive controller is also coupled, via an interface 21, to a host 22. The host may comprise a data processing system or server, or may comprise a drive subsystem controller, for example, for an automated data storage library. An example of a data storage drive is an IBM 3590 tape storage subsystem.

The data storage drive 11 is modified so that drive controller 20 is also coupled to a wireless interface 25. The data storage cartridge 10 is also modified to incorporate a wireless interface 26 and a computer processor 30 with a nonvolatile memory 31.

The cartridge wireless interface 26 receives power and data from, and sends data to, the wireless interface 25 of the data storage drive when the data storage cartridge 10 is mounted in the data storage drive 11. Preferably, the wireless interface 25, 26 is an RF wireless interface. An example is described in U.S. Pat. No. 4,941,201. A high frequency inductive wireless interface may also be employed, which is of sufficiently high frequency that the magnetic storage media 12 is not adversely affected by the signal. Examples are described in U.S. Pat. No. 4,650,981, U.S. Pat. No. 4,758,836, and U.S. Pat. No. 3,859,624. Alternatively, the inductive antennae for the wireless interface are shielded from the magnetic storage media 12.

The computer processor 30 comprises a microprocessor chip, for example, an Intel Pentium chip arranged to operate in a low power environment, such as a portable computer, and the associated nonvolatile memory 31 is also arranged to operate in a low power environment.

In accordance with the present invention, the wireless interface 26 and the computer processor 30 with the associated nonvolatile memory 31 are mounted in, and provide a portable security system for, the portable data storage cartridge 10. Specifically, the security system, by being mounted in the portable data storage cartridge, becomes portable, accompanying the cartridge at all times. Thus, the security is no longer exclusively dependent upon the security of the data storage drive 11 and its host system 22, and is not limited to a particular drive or host. The cartridge may be used with different drives and host systems at varied locations, and may be used with updated drives and updated data processing systems. Further, the security system may be managed and updated to change access to the data at any of the drives by users which have previously been granted permission via the user or class tables in the data storage cartridge. The security system remains portable and within the data storage cartridge.

Figure 2:
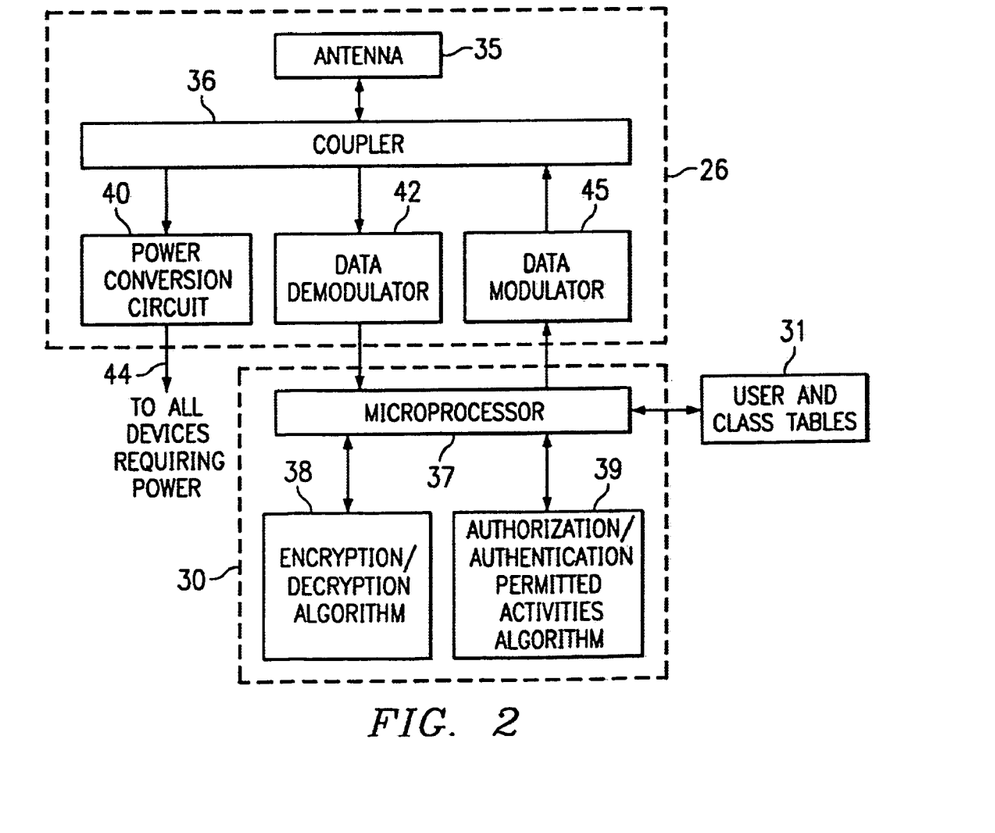
FIG. 2 is a block diagram of an RF interface, computer processor, and nonvolatile storage in the data storage cartridge of FIG. 1.

The wireless interface 26 and computer processor 30 are detailed in FIG. 2. An antenna 35 receives the RF signal from the RF interface of the data storage drive, and coupler 36 supplies the received signal to a power conversion circuit 40, and to a data demodulator 42. The power conversion circuit 40 converts the received signal to a power current, supplying the current on line 44 to all of the devices in the data storage cartridge requiring power, including the computer processor 30, the data demodulator 42, and a data modulator 45. The received signal from antenna 35 is encoded, and data demodulator 42 receives the incoming coded signal from coupler 36 and demodulates the signal to provide data signals to the computer processor 30. Data signals from the computer processor 30 are provided to the data modulator 45 which encodes the signals for transmission by coupler 36 and antenna 35 to the RF interface of the data storage drive.

The computer processor 30 is a programmable computer processor comprising a microprocessor 37 having computer readable program code embodied therein, including an encryption/decryption algorithm 38 and an authorization/authentication/permitted activities algorithm 39. The nonvolatile storage 31 is employed to store user and class tables, as will be explained. The nonvolatile storage may comprise a separate chip attached to the programmable computer processor 30 and its microprocessor 37, or may comprise a portion of the same chip. The computer readable program code may be stored in a nonvolatile internal memory of the computer processor 30 or may also be stored in the nonvolatile memory 31, and loaded into the computer processor 30. The algorithms 38 and 39 may be preloaded into the programmable computer processor 30, or may be supplied to the computer processor at initialization over the wireless interface 26.

The computer processor 30, employing the algorithm 39, provides a user table in nonvolatile memory 31 comprising at least a unique user identifier for each authorized user, which may comprise a user symbol and a corresponding key, and at least one permitted activity the user is authorized to conduct with respect to the data storage media, and provides a class table in nonvolatile memory 31 which has unique class identifier for each authorized class of users, which may comprise a class symbol and a corresponding key, and at least one permitted activity each class of users is authorized to conduct with respect to the data storage media.

In accordance with the predetermined algorithm 39, the user identifier, when combined with a user authentication message from the authorized user, employing the encryption/decryption algorithm 38, authorizes the user. The computer processor 30 receives user authentication messages from the data storage drive via the wireless interface 26, and combines the user authentication message with the user identifier from the user table in accordance with the predetermined algorithm 39 and encryption/decryption algorithm 38 to authorize or deny the user activity, and transmits the user authorization or denial to the data storage drive via the wireless interface 26.

Herein, the encryption/decryption algorithm 38 comprises any suitable encryption/decryption algorithm which both provides security and portability. Examples of algorithms which provide security and portability are the "public key" cryptography algorithms. U.S. Pat. No. 4,405,829 describes a "public key" encryption/decryption algorithm that has become a defacto-standard, often called the "RSA" cryptosystem after the names of the authors. An implementation that provides authentication and allows authorization as employed herein is described in U.S. Pat. No. 4,748,668. Accordingly, the user identifier comprises a user symbol and a user decrypting sender public key. When combined with a user authentication message from the authorized user that is encrypted by a receiver public key, the user is authorized. Additionally, with the use of a sender private key and the receiver public key, the authentication message can be encrypted so that, with the use of a receiver private key and the sender public key, the authentication message is both decrypted and the message is known to have come from the sender.

Figure 3:
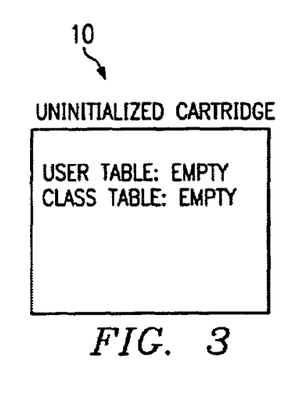
FIGS. 3 and 4 are diagrammatic representations of tables of the nonvolatile storage of FIG. 2.
Figure 4:
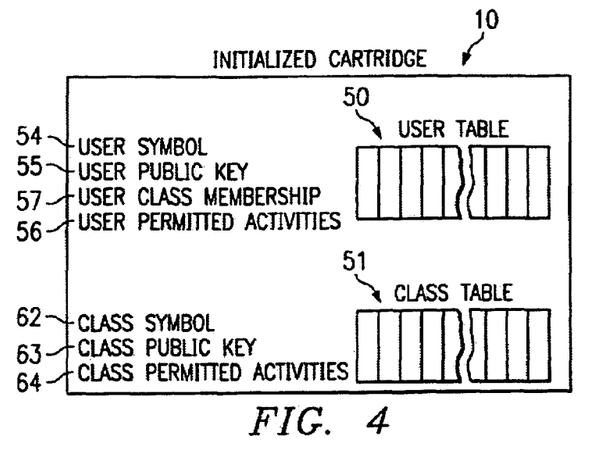
Figure 5:
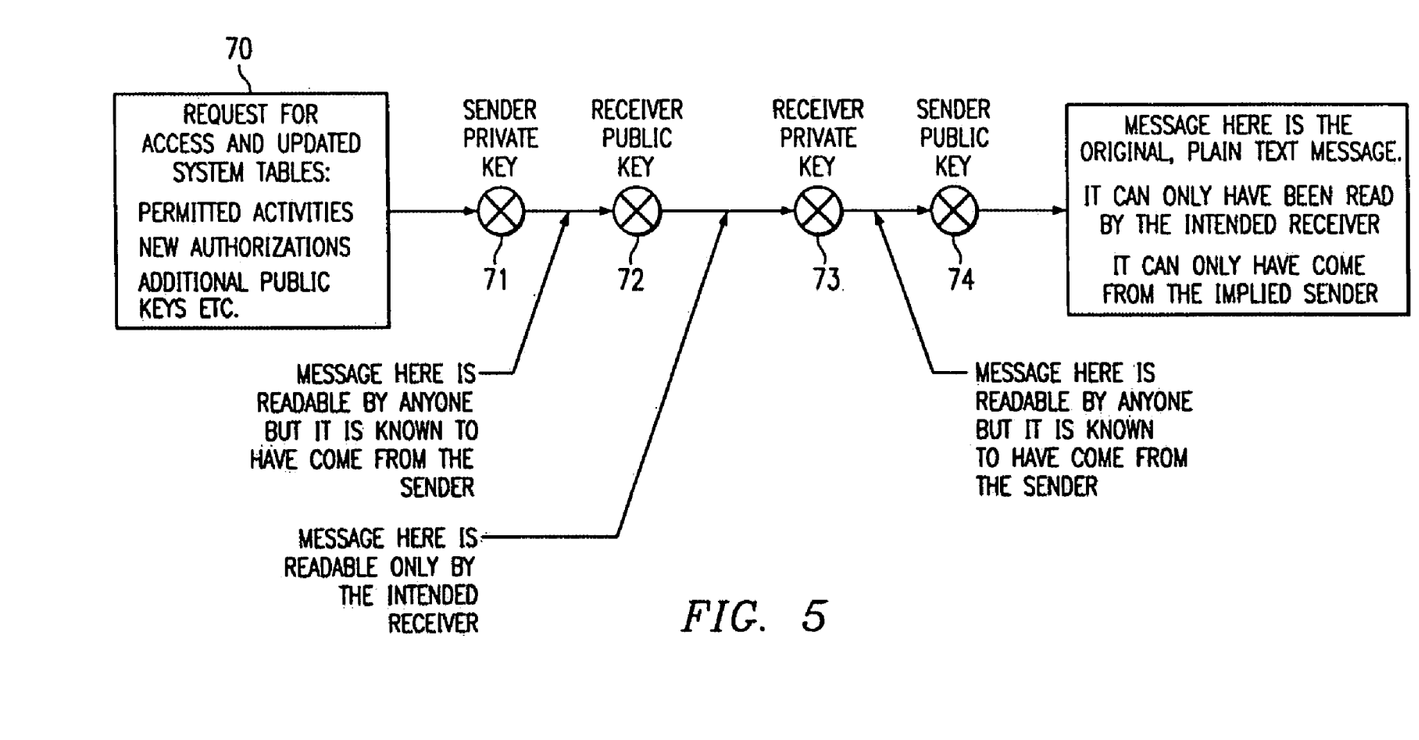
FIG. 5 is a diagrammatic representation of the encryption of a request for access and its decryption in accordance with the present invention.

FIGS. 3, 4 and 5 illustrate examples of cartridge initialization with the user and class tables and the operation of the algorithm 39 employing the cryptography algorithm 38. FIG. 3 illustrates an uninitialized data storage cartridge 10 either without user and class tables, or which has established user and class tables, but which are empty. FIG. 4 illustrates the data storage cartridge 10 after the user table 50 and the class table 51 have been initialized in accordance with the present invention.

As discussed above, the computer processor 30 provides the user table 50 with at least a unique user identifier for each authorized user and at least one permitted activity the user is authorized to conduct with respect to the data storage media. Preferably, each user identifier in the user table 50 comprises a user symbol 54 and a user decrypting sender public key 55. The permitted activities 56 of the user may comprise a separate entry for each user identifier and permitted activity that the user is authorized to conduct. Alternatively, the user table may comprise a separate entry for each user identifier, the entry comprising all of the permitted activities that the user is authorized to conduct. The user table 50 additionally comprises any class membership 57 of each user, so that the user may be authorized with respect to the class table 51 by the user authorization.

In accordance with the present invention, the class table 51 is provided that has an unique class identifier for each authorized class of users, and at least one permitted activity 64 that each class of users is authorized to conduct. Preferably each class identifier in the class table 51 comprises a class symbol 62 and a class decrypting sender public key 63. The class identifier, when combined with a user authentication message from a user of the authorized class of users in accordance with the predetermined algorithm, authorizes the user. Thus, the user may be authorized with respect to the class table either by the class authorization or by the user authorization 57.

The permitted activities 64 of the members of the class may comprise a separate entry for each class identifier and permitted activity that the user/class member is authorized to conduct. Alternatively, the class table may comprise a separate entry for each class identifier, the entry comprising all of the permitted activities that the user/class member is authorized to conduct.

The permitted activities 56 in the user table 50 may comprise 1) read access to data stored in the data storage media, 2) write access to data stored in the data storage media, 3) read user entry of the user table, 4) read all entries of the user table, 5) add entries to the user table, 6) change/delete entries to the user table, 7) read class entry of the class table, 8) read all entries of the class table, 9) add entries to the class table, 10) change/delete entries to the class table, and 11) change the receiver private key.

The permitted activities 64 in the class table 51 may comprise 1) read access to data stored in the data storage media, 2) write access to data stored in the data storage media, 3) read the user's class entry of the class table, 4) read all entries of the class table, 5) add entry to the class table, 6) change/delete entries to the class table, 7) read all entries of the user table, 8) add entries to the user table, 9) change/delete entries to the user table and 10) change the receiver private key.

The operation of a public key algorithm for authorizing access is illustrated with respect to FIG. 5. The preferred implementation is one as described above which both allows an authentication message to be decrypted, and also provides a "signature" assuring that the authentication message has come from the sender. In one example, the user/class symbol will have been sent. A user/class member generates an authentication message 70. Preferably, the authentication message includes the request for access to conduct the desired activity, saving a need for a second message. The user/class member has a sender private key 71 which is employed, together with a receiver public key 72, to encrypt the authentication message. The receiver public key 72 is made known to the users and class members and is mathematically related to the sender private key, as discussed in the '668 patent, but the message cannot be decrypted with the same keys. The message instead is only readable by the intended receiver because of the use of the receiver public key. When decrypted, the message must have therefore been intended for the receiver. Thus, at the cartridge, the algorithm of the computer processor decrypts the message employing a receiver private key 73 and a sender public key 74. As discussed above, the sender public key has been made available and is kept in the user table or in the class table. Thus, if the keys decrypt the encrypted authentication message, the message is known to have come from the sender who is the user/class member. This is known as providing an authentication "signature".

As the result, the user/class member may rely on the security of the portable security system, method, and computer readable program code of a computer program product, of the present invention, which resides in a portable data storage cartridge for managing access to the portable data storage cartridge.

Figure 6:
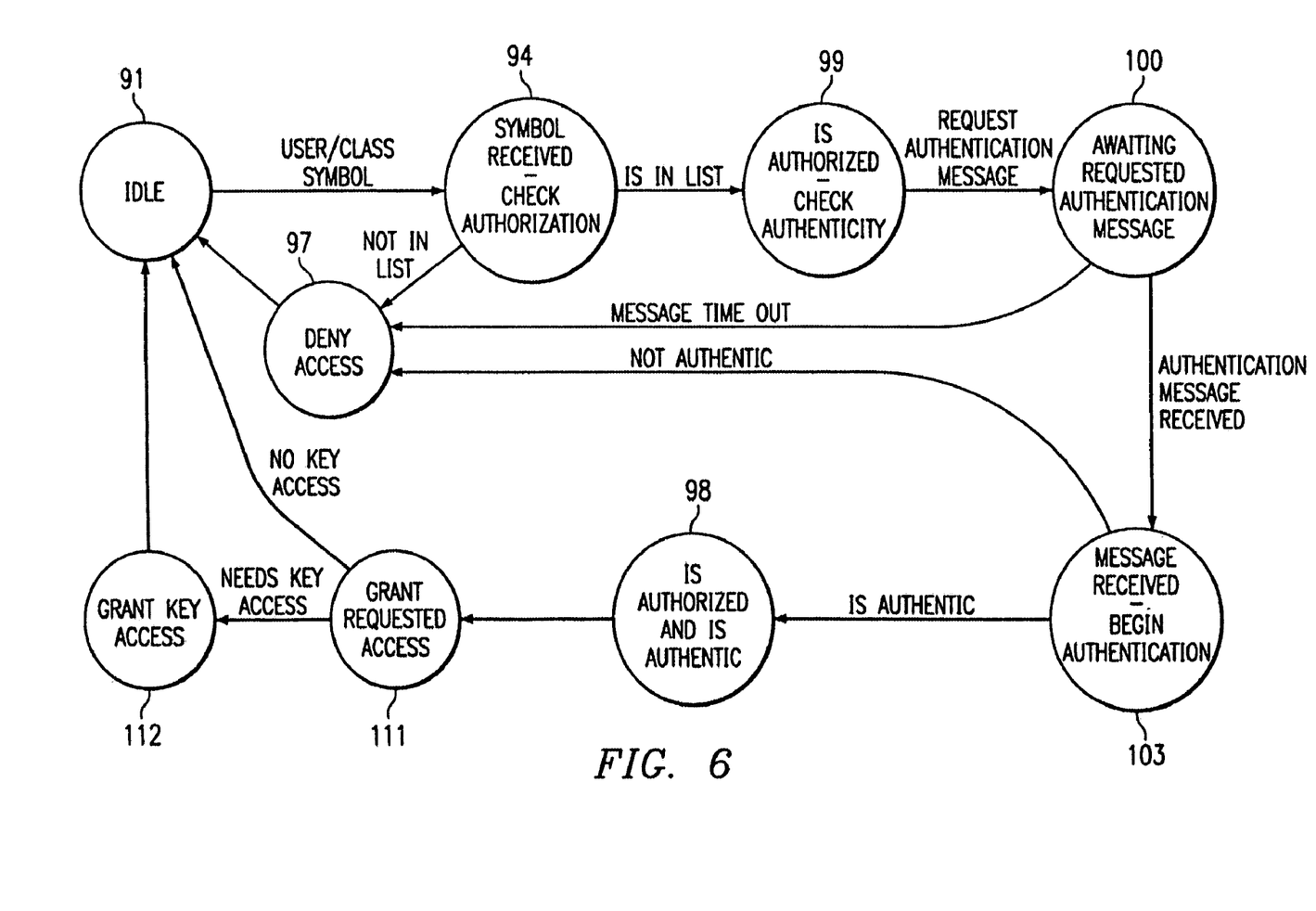
FIG. 6 is a diagrammatic representation of a state diagram of the operation of the computer processor of FIG. 2 in accordance with the present invention.
Figure 7:
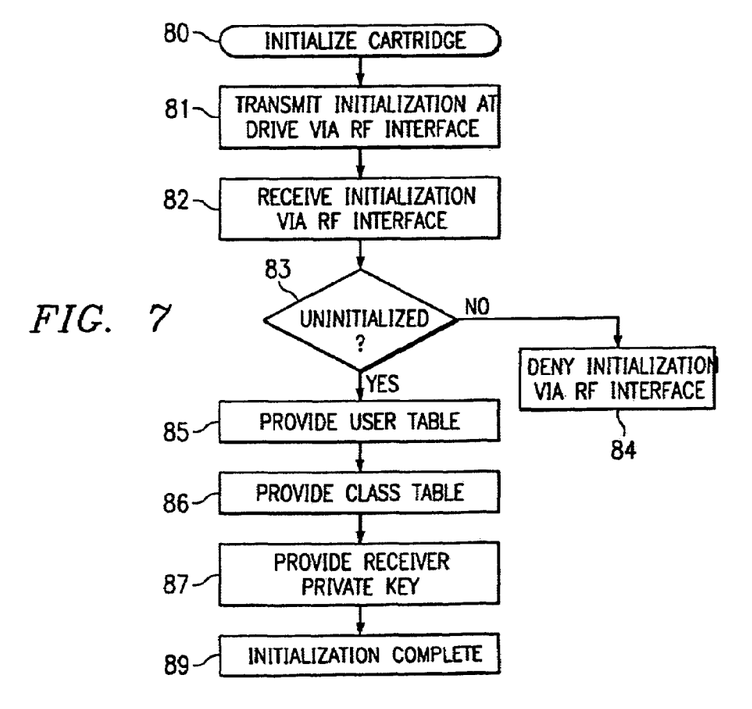
FIGS. 7 and 8 are flow charts depicting the method of the present invention for initializing a data storage cartridge and for conducting the authentication and authorization of a user request.
Figure 8:
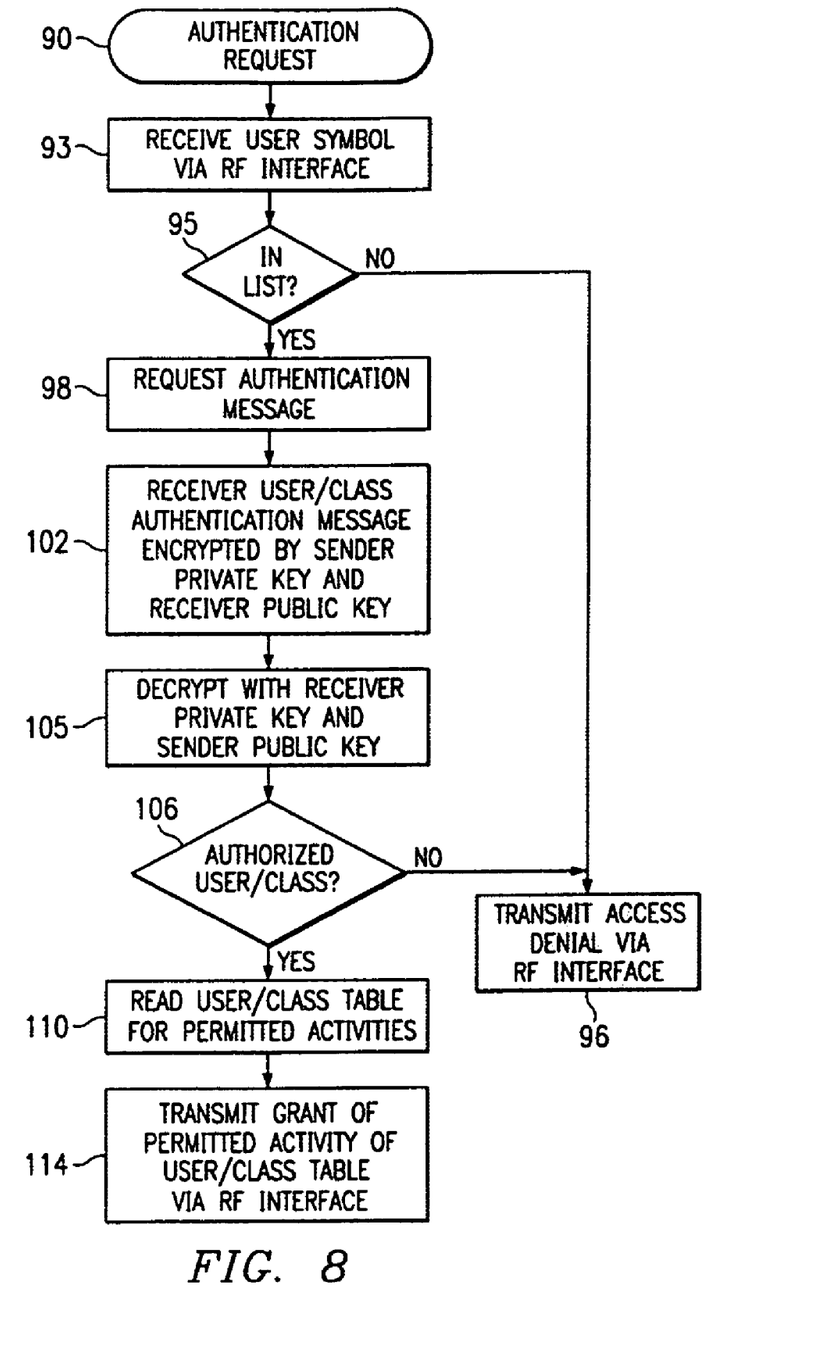

A state diagram of the operation of the computer processor in accordance with the present invention is illustrated in FIG. 6, and flow charts of the method of the present invention are depicted in FIGS. 7 and 8.

Referring to FIGS. 1 and 7, the initialization of an uninitialized cartridge 10 is initiated at step 80. The cartridge is loaded into a drive 11 having a wireless interface 25, and, in step 81, the initialization information is transmitted to the cartridge. The initialization information is not encrypted, and is provided when in a secure situation. The cartridge wireless interface 26 receives the initialization information in step 82 and provides the information to the cartridge processor 30. As discussed above, the initialization information comprises the user and class tables. The cartridge processor 30, in step 83, recognizes that the input from the wireless interface is initialization information, and determines whether the cartridge is uninitialized. If the cartridge has been initialized previously, a message is sent to the drive 11 over the wireless interface, in step 84, denying the initialization.

If the cartridge is uninitialized, an initializing drive or host computer provides the user table to the cartridge computer processor 30 in step 85 and provides the class table in step 86, both via the wireless interface. The receiver private key may have been provided previously, or, as an optional step 87, may be provided in the initialization load. The initialization is then complete, and the drive is informed of the completion in step 89.

Referring to FIGS. 1, 6 and 8, an authentication or an access request is initiated in step 90, e.g., by sending the user symbol, and the cartridge computer processor 30 is initially in an idle state 91. In step 93, the request is received at the wireless interface 26 and is provided to the computer processor. The computer processor moves to state 94 and, in step 95, determines whether the requesting user or class member is in the list of the user or class table. If not in the table, the computer processor 30, in step 96, moves to state 97 and denies access to the user/class member via the wireless interface 26.

If the user or class member is in the respective table, the computer processor, in step 98, moves to state 99 and requests the authentication message from the user or class member. The computer processor moves to state 100 while awaiting the authentication message, and, if the message is not received in a time out period, denies access in state 97. In step 102, the authentication message is received by the wireless interface 26 and forwarded to the computer processor 30. As discussed above, the authentication message is encrypted by the sender private key and the receiver, cartridge) public key. The computer processor moves to state 103, receiving the message and beginning the authentication. In step 105, the computer processor conducts the decryption of the authentication message employing the receiver private key and employing the sender public key from the user or class table. In step 106, the computer processor determines whether the user or class member is authorized. If not, the computer processor 30 moves to state 97 and, in step 96, denies access.

If the user or class member is authorized, the computer processor moves to state 98 and, in step 110, reads the user or class table for the permitted activities for the user/class member. As discussed above, the authentication message preferably includes a request to conduct one or more activities. Based on the permitted activities of the user or class table and the request, the computer processor moves to state 111 or to state 112 to grant the permitted activity. The permission to change the receiver private key will be very limited to a particular user or to a particular class. Thus, the grant of the permitted activities of state 111 are transmitted in step 114 to the drive 11 over the wireless interface. As an example, the requested access from state 111 does not require a decrypting key for the data, such as changing an entry to the user table. State 112 is entered only in response to a specific request by the user/class member, and, in step 114, the decrypting key for the data on the cartridge data storage media is transmitted to the drive 11 from the cartridge 10 over the wireless interface 26. The computer processor then moves back to the idle state 91, and the data may be read.

As specific security examples, read access to the data stored in the data storage media is controlled by the computer processor 30 in the portable cartridge through the decrypting key; table access is enforced by the computer processor 30 in the portable cartridge; and write access is controlled logically in the drive, which may be under the logical control of the processor. However, the cartridge itself cannot totally restrict writing per se.

Thus, the present invention provides a security system which is portable and may be managed to accommodate changes to access to the data of the data storage cartridge 10. Only certain users are allowed access to each cartridge, and only certain users are allowed to define who has access to that data.

While the preferred embodiments of the present invention have been illustrated in detail, it should be apparent that modifications and adaptations to those embodiments may occur to one skilled in the art without departing from the scope of the present invention as set forth in the following claims.

I claim:

1. A method for providing a portable secure interface to a data storage cartridge, said data storage cartridge having data storage media for storing data for read/write access by a user of a data storage drive when mounted in said data storage drive, and a wireless interface mounted in said portable data storage cartridge for receiving power and data from, and sending data to, said data storage drive when mounted in said data storage drive, said data storage cartridge having a user table separate from said data storage media, comprising at least a unique user identifier for each authorized user and at least one permitted activity said user is authorized to conduct with respect to said data storage media, said user identifier, when combined with a user authentication message from said authorized user in accordance with a predetermined algorithm, authorizes said user, said method comprising the steps of:

receiving said user authentication messages from said data storage drive via said wireless interface;

separate from said data storage media, combining said user authentication message with at least part of said user identifier from said user table in accordance with said predetermined algorithm to authorize or deny said user activity; and transmitting said user authorization or denial to said data storage drive via said wireless interface.

2. The method of claim 1, wherein each said user identifier comprises a user symbol and a user decrypting key, wherein said user authentication message comprises an encrypted user authentication message which may be decrypted by said user decrypting key, and wherein said combining step comprises decrypting said user authentication message by said user decrypting key.

3. The method of claim 2, wherein said user decrypting key comprises a sender public key, and wherein said predetermined algorithm comprises a public key cryptographic algorithm.

4. The method of claim 3, wherein said user authentication message is encrypted by a sender private key and a receiver public key, wherein said public key cryptographic algorithm decrypts said user authentication message employing a receiver private key and said sender public key, and wherein said combining step comprises decrypting said user authentication message by said receiver private key and said sender public key, whereby said user authentication message is known to have come from said user.

5. The method of claim 1, wherein said user table comprises a plurality of said permitted activities, selected ones of which each of said users may be authorized to conduct, said permitted activities comprising 1) read access to data stored in said data storage media, 2) write access to data stored in said data storage media, 3) read the user entry of said user table, 4) read all entries of said user table, 5) add entries to said user table, and 6) change/delete entries to said user table; and wherein said transmitting step comprises transmitting authorization to conduct the selected said user permitted activities said user is authorized to conduct.

6. The method of claim 1, wherein said user table comprises a separate entry for each said user identifier and said permitted activity said user is authorized to conduct; and wherein said transmitting step additionally comprises identifying said user permitted activities from said separate entries.

7. The method of claim 1, wherein said step of providing said user table comprises a separate entry for each said user identifier, said entry comprising all said permitted activities said user is authorized to conduct; and wherein said transmitting step additionally comprises identifying said user permitted activities from said user separate entry.

8. The method of claim 1, wherein said data storage cartridge additionally comprises a class table comprising at least a unique class identifier for each authorized class of users and at least one permitted activity said class of users is authorized to conduct with respect to said data storage media, said class identifier, when combined with a user authentication message from a user of said authorized class of users in accordance with said predetermined algorithm, authorizes said user;

wherein said combining step additionally comprises, upon receiving said user authentication messages from said data storage drive via said wireless interface, combining said user authentication message with said class identifier from said class table in accordance with said predetermined algorithm to authorize or deny said class activity to said user; and wherein said transmitting step additionally comprises transmitting said class authorization or denial to said data storage drive via said wireless interface.

9. The method of claim 8, wherein said user table additionally comprises any class membership of each said user; and wherein said combining step additionally authorizes said user with respect to said class table either by said class authorization or by said user authorization.

10. The method of claim 8, wherein said user table and said class table comprise a plurality of permitted activities, selected ones of which each of said users may be authorized to conduct, said permitted activities comprising 1) read access to data stored in said data storage media, 2) write access to data stored in said data storage media, 3) read all entries of said class table, 4) add entries to said class table, and 5) change/delete entries to said class table; and wherein said transmitting step comprises transmitting authorization to conduct the selected said user and said class permitted activities said user is authorized to conduct.

11. The method of claim 1, wherein said data stored in said data storage media is encrypted, wherein said step of providing said user table permitted activities comprises providing at least 1) read access to data stored in said data storage media, and wherein said step of transmitting said user authorization for said read access additionally comprises transmitting a decryption key for said encrypted stored data.

* * * * *